No. 795,021. PATENTED JULY 18, 1905.
O. J. BEALE.
MACHINE FOR GENERATING GEAR TEETH.
APPLICATION FILED DEC. 9, 1901.
9 SHEETS—SHEET 1.

FIG. 1.

WITNESSES,
James H. Thurston
Catherine G. Bradley.

INVENTOR,
Oscar J. Beale
BY Wilmarth H. Thurston
ATT'Y.

No. 795,021. PATENTED JULY 18, 1905.
O. J. BEALE.
MACHINE FOR GENERATING GEAR TEETH.
APPLICATION FILED DEC. 9, 1901.

WITNESSES,
James H. Thurston
Catherine G. Bradley.

INVENTOR,
Oscar J. Beale
BY Wilmarth H. Thurston
ATT'Y.

No. 795,021. PATENTED JULY 18, 1905.
O. J. BEALE.
MACHINE FOR GENERATING GEAR TEETH.
APPLICATION FILED DEC. 9, 1901.

WITNESSES,
James H. Thurston
Catherine G. Bradley

INVENTOR,
Oscar J. Beale
BY Wilmarth H. Thurston
ATT'Y.

No. 795,021. PATENTED JULY 18, 1905.
O. J. BEALE.
MACHINE FOR GENERATING GEAR TEETH.
APPLICATION FILED DEC. 9, 1901.

WITNESSES,
James H. Thurston
Catherine G. Bradley.

INVENTOR,
Oscar J. Beale
BY Wilmarth H. Thurston
ATT'Y.

No. 795,021. PATENTED JULY 18, 1905.
O. J. BEALE.
MACHINE FOR GENERATING GEAR TEETH.
APPLICATION FILED DEC. 9, 1901.

WITNESSES,
James H. Thurston
Catherine G. Bradley

INVENTOR,
Oscar J. Beale
BY Wilmarth H. Thurston
ATT'Y.

No. 795,021. PATENTED JULY 18, 1905.
O. J. BEALE.
MACHINE FOR GENERATING GEAR TEETH.
APPLICATION FILED DEC. 9, 1901.

Witnesses:
James H. Thurston
Catherine G. Bradley

Inventor.
Oscar J. Beale
By Wilmarth H. Thurston
Attorney.

No. 795,021. PATENTED JULY 18, 1905.
O. J. BEALE.
MACHINE FOR GENERATING GEAR TEETH
APPLICATION FILED DEC. 9, 1901

Witnesses
James H. Thurston
Catherine G. Bradley

Inventor
Oscar J. Beale
By
Wilmarth H. Thurston
Attorney.

No. 795,021.                                                                    Patented July 18, 1905.

UNITED STATES PATENT OFFICE.

OSCAR J. BEALE, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND.

MACHINE FOR GENERATING GEAR-TEETH.

SPECIFICATION forming part of Letters Patent No. 795,021, dated July 18, 1905.

Application filed December 9, 1901. Serial No. 85,202.

*To all whom it may concern:*

Be it known that I, OSCAR J. BEALE, of the city and county of Providence and State of Rhode Island, have invented certain new and useful Improvements in Machines for Generating Gear-Teeth; and I do hereby declare the following specification, taken in connection with the accompanying drawings, forming a part of the same, to be a full, clear, and exact description thereof.

The invention relates to machines for forming gear-teeth, and more especially to that class of machines in which the teeth are generated by rolling the gear-blank against a cutter in such a manner that the cutter generates a correct tooth-surface on the blank. Such machines are especially adapted for forming the teeth of bevel-gears in which the curvature of the tooth-surfaces and the size of the teeth change from end to end of the teeth, making it impracticable to cut correctly-formed teeth in the manner in which the teeth of spur-gears are usually cut. Machines may be constructed and arranged, however, to generate the teeth of spur-gears, and certain of the features of the present invention may be embodied in either machines for generating the teeth of spur-gears or machines for generating the teeth of bevel-gears, the mechanism being modified to give the parts the proper relative movements to suit the varying conditions.

In machines operating on the generating principle the cutting edge (or edges) of the cutter, whether it be a reciprocating planing-cutter or a rotary milling-cutter, travels in the tooth-surface of an "imaginary" gear, (which term in this connection includes a rack,) and the gear-blank is given a motion which corresponds to the rolling of its pitch-surface on the pitch-surface of the imaginary gear, so that as the pitch-surfaces of the gear-blank and imaginary gear roll together the cutter generates a tooth-surface conjugate to the tooth-surface in which the cutting edge or edges travel.

Certain features of the present invention relate to devices and mechanisms for supporting the gear-blank and giving it such a motion that its pitch-surface will roll upon the pitch-surface of the imaginary gear in a tooth-surface of which the edge (or edges) of the cutter travels. These features of invention may be used in connection with any suitable construction and arrangement of cutter. In embodying the broader of these features of invention in an automatic machine having the capacity of generating the teeth of gears varying in size, pitch, and in the angle of the pitch-cone additional features of invention have been employed which are not essentially involved in the broader features, but which are important in that they contribute in producing a highly-efficient machine having a wide range of utility. In this machine the blank-spindle is mounted in a reciprocating carrier, and as the carrier reciprocates the spindle is rotated on its axis through toothed gearing, the resultant of the two movements being such that the gear-blank carried by the spindle is given a motion as of rolling upon its pitch-surface over the pitch-surface of the imaginary gear in the tooth-surface of which the cutting edges travel. As the machine is designed for generating the teeth of bevel-gears, the carrier is mounted to swing about an axis which intersects the axis of the blank-spindle at the apex of the pitch-cone, and to adapt the machine for generating the teeth of gears having pitch-cones of varying angles the spindle is mounted so that it may be adjusted to vary the angle between its axis and the axis of the carrier. It is desirable to firmly support the gear-blank close up to its hub, and in order to enable a wide range of gear-blanks to be thus supported the blank-spindle is mounted so that it may be adjusted radially of the swinging carrier and is arranged to support the gear-blank from the large end. With this arrangement the gear-blanks may be secured to the spindle with the hub close up to the bearings of the spindle whatever the angle of the pitch-cone or the size of the gear-blank. In generating the teeth of gears having different pitch-cones the ratio between the swinging movement of the spindle and the rotary movement on its axis must be varied to give the blank the proper rolling movement, and a toothed gearing-drive for rotating the spindle on its axis readily adapts itself to such variation by enabling the employment of variable-speed gearing between the spindle and the driver for rotating the same. A simple and convenient form of such gearing is a system of change-gears. A gearing-drive for the spindle is also well adapted to the automatic indexing of the blank in embodying this feature in an automatic machine. To get the greatest benefit from automatically indexing the blank-spindle involves also the automatic reciprocation and rotation of the spindle, and one of the features of the invention consists in combining mechanism for automatically reciprocating and simultaneously rotating a blank-spindle with mechanism for automatically indexing the blank. The use of variable-speed gearing for varying the ratio between the reciprocating movement of the spindle and the movement of rotation involves for some angles of pitch-cone an approximation to the exact theoretical ratio. With gearing which it is practical to use this approximation is sufficiently accurate so far as the rolling of the blank on its pitch-surface is concerned; but in case the indexing movement is transmitted to the spindle through this gearing the variation from the exact ratio would result in inaccurate indexing. In such case the error introduced by the use of approximate or, as it is sometimes termed, "fractional" gearing is eliminated from the indexing movements of the spindle by a rectifying mechanism, and one feature of the invention consists in the combination, with the gearing for rotating the blank-spindle as it reciprocates, of a rectifying mechanism for insuring the proper indexing of the blank-spindle should it be necessary to use fractional gearing in said gearing. A simple and effective form of such rectifying mechanism consists of a system of gearing corresponding to the fractional gearing inversely arranged and interposed between the driver for the fractional gearing and the indexing-gearing.

While I prefer to roll the blank against the cutter with a motion as of rolling upon its pitch-surface, it will be understood that so far as the features of invention relating to the mechanisms for supporting and operating the blank are concerned it is not essential that the blank be given a motion as of rolling upon its pitch-surface, but that the blank may be given any proper rolling movement to cause tooth-surfaces to be generated thereon as it is rolled against a cutter, the rolling movement to be given to the blank depending upon the arrangement of the cutter.

The features of invention relating to the devices for supporting and controlling the movements of the blank-spindle may be employed in connection with various forms and arrangements of cutters, and they have been embodied in a machine in which certain other features of invention relating to the construction and arrangement of the cutting devices have also been embodied, which cooperate with the blank supporting and controlling devices in insuring an efficient and economic generation of the gear-teeth. In this machine the cutting edges, which travel in a plane corresponding to the surface of a tooth of an imaginary gear, over the pitch-surface of which the pitch-surface of the gear-blank rolls, are formed on teeth at the periphery of a disk of such a size and shape that the tooth-surface on the blank is generated by rolling the blank against the edge of the disk without any movement of the disk other than that about its axis. An effective arrangement of cutter for generating bevel-gear teeth is with the cutting edge or edges traveling in a plane corresponding to the surface of an imaginary crown-gear having tooth-surfaces which are converging planes, since gears which will run in such a crown-gear will run together. In the present case the cutters are accordingly so arranged that the edge of the disk against which the gear-blank is rolled is, in effect, the tooth-surface of a crown-gear, and one feature of the invention consists in the combination of a series of traveling cutting-teeth, which are, in effect, the tooth-surface of a crown-gear, and mechanism for rolling a gear-blank against the cutters with a motion as of rolling on its pitch-surface over the pitch-surface of the crown-gear. A single cutting-disk of this character will generate only one surface of a gear-tooth as the gear-blank is rolled against it, so that the use of a single cutting-disk involves a readjustment of the blank and cutter after one side of all the teeth has been generated and a second complete indexing of the blank for generating the opposite sides of the teeth. This readjustment of the cutter and blank and second indexing may be eliminated by employing two cutting-disks and so arranging them that the cutting edges against which the blank is rolled are, in effect, a tooth of the imaginary gear, over the pitch-surface of which the gear-blank is rolled, and a feature of the invention consists in providing two cutters the cutting edges of which form a tooth of an imaginary gear. The cutter or cutters are so mounted that the proper adjustments may be made to bring the edge of the disk or disks into the proper relation with the blank or to vary the inclination of the cutter, so that the cutting edges may correspond to the tooth-surfaces of gears of different size, or to vary the angle of pressure of the gear-teeth, as will be more fully explained, and these adjustments form additional features of invention.

The invention also includes further features of novelty, as will appear from the detailed description to follow and the claims.

All the various features of invention have been embodied in an automatic machine for generating bevel-gear teeth capable of adjustment for gears of varying size or angle of pitch-cone and to cut various forms of gear-teeth, and a clear understanding of these features will be had by reference to the accompanying drawings, showing such machine, it being understood, however, that various of the features of invention are not confined in their application to automatic machines or to machines for generating bevel-gear teeth or to machines having the specific construction, arrangement, and mode of operation of the machine illustrated.

In the machine shown the blank-supporting head 1, Figs. 1, 4, 5, and 6, is fixed to the base 2 of the machine, and in this head are mounted the devices for supporting and controlling the movements of the blank-spindle 3. The swinging carrier 4, on which the spindle is supported, is secured upon a shaft 5, mounted in the head 1, and this carrier is given a reciprocatory swinging movement through a segment 6, formed thereon, which is engaged by a gear 7, secured to one end of a shaft 8. At its opposite end the shaft 8 carries a pinion 9, which is engaged by a gear-segment 10, mounted on a shaft 11 and oscillated through an arm 12, which is connected by a link 13 with a crank-pin 14, carried by a constantly-rotating shaft 15. The crank-pin 14 is carried in a slide 16, which is mounted in a slot in a disk 17, secured to the shaft 15, and may be adjusted radially of the disk to vary the swing of the carrier 4 by a screw 18.

Figure 10:
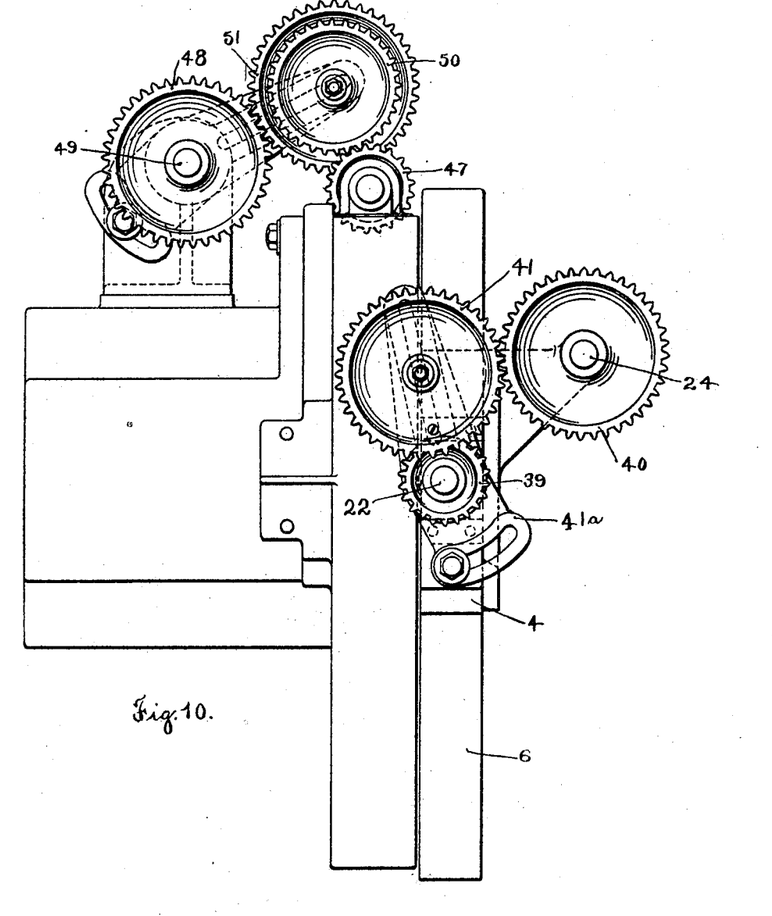
Fig. 10 is a detail showing the gearing for varying the rotation of the blank-spindle and the rectifying-gearing.
Figure 11:
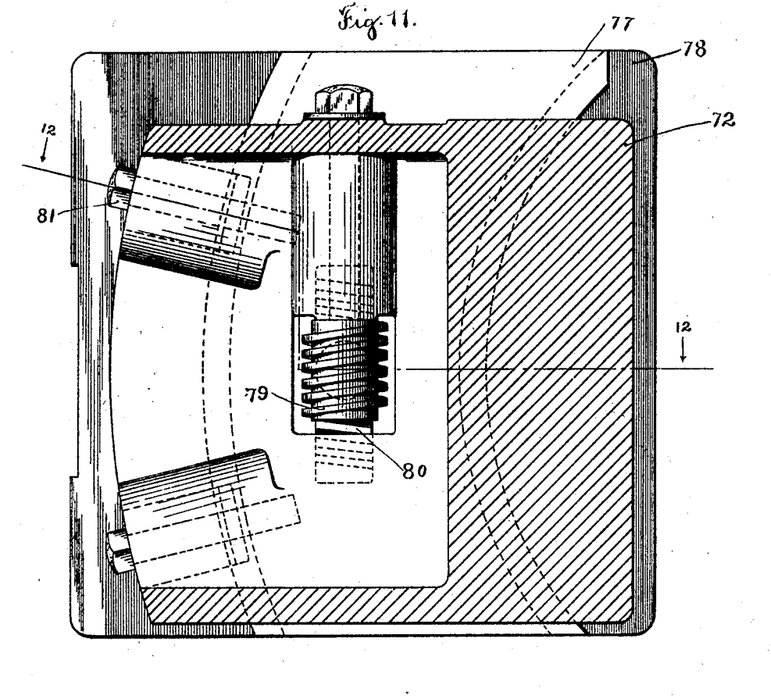
Fig. 11 is a sectional detail showing one of the cutter adjustments.
Figure 12:
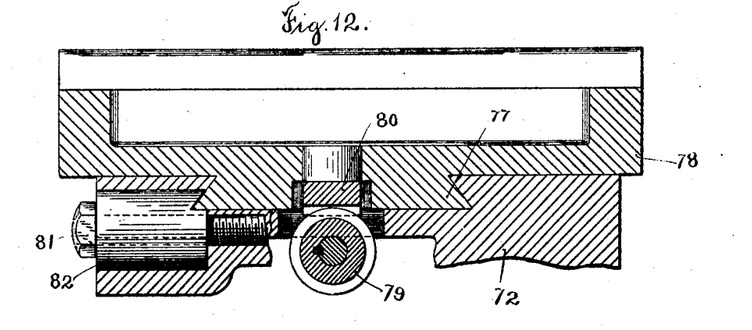
Fig. 12 is a sectional detail on line 12 12, Fig. 11.

The spindle 3 is supported upon the carrier in bearings and is rotated on its axis as the carrier swings by means of gearing connected with the spindle and driven from a stationary gear 19, mounted upon the bushing 20, which surrounds the shaft 5, so that the gear is concentric with the axis of the carrier. The gear 19 is engaged by a pinion 21, secured to a shaft 22, mounted on the carrier, and the shaft 22 is connected, through a series of gears 23, with a second shaft 24, also mounted on the carrier. The shaft 24 carries a spiral gear 25, Fig. 2, which engages a spiral gear 26, secured to one end of a short shaft 27, to the other end of which is secured a bevel-gear 28, Fig. 5, which meshes with a bevel-gear 29, Fig. 6, secured to the spindle 3. This construction and arrangement provides one simple and efficient form of mechanism for rotating the spindle through toothed gearing as the carrier swings, and the concentric gear forms a simple and effective driver for such mechanism. This form of mechanism also readily adapts itself to the various adjustments of the parts incident to the generating of different gears. The gearing between the concentric gear 19 and the spindle should be so proportioned that the spindle will be properly rotated on its axis as the pinion 21 rolls over the gear 19 to give the blank carried by the spindle a motion as of rolling on its pitch-surface over the pitch-surface of the imaginary gear, in a tooth-surface of which the cutter acts. If the gear-blank is to have a motion as of rolling on its pitch-surface, it should be so supported that the apex of the pitch-cone is in the axis of the carrier 4, and the spindle should therefore be so arranged with reference to the axis of the carrier that the apex of the pitch-cone may be so located. To enable the apex of the pitch-cone of the gear-blank to be brought into the axis of the carrier under varying conditions as to size or form of gears to be acted upon, the spindle is carried in a carriage 30, mounted on ways on the carrier 4 and adjustable radially of the carrier through a screw 31, which is connected with the carriage and is engaged by a nut 32, mounted on the carrier. The nut may be turned to adjust the carriage through a bevel-gear 33, secured to the nut and engaged by a bevel-gear 34 on a shaft, to the outer end of which a hand-wheel 35 is secured. The spiral gear 25 is carried by the carriage and is mounted to slide on the shaft 24 to accommodate the movement of the carriage. To adapt the machine for operating upon gears having pitch-cones of varying angles, the spindle is mounted so that the angle between the axis of the spindle and the axis of the carrier may be varied. This angular adjustment is effected by supporting the spindle in a head 36, which is mounted in segmental ways 37 on the carriage 30. The head is held in adjusted position by binding-bolts 38. To accommodate this adjustment, the shaft 27, to which the spiral gear 26 is secured, is so arranged that its axis is in the axis about which the spindle 3 is adjusted to vary the angle between the spindle and the axis of the carrier. The angular and radial adjustment of the spindle on the carrier also enables gears of various size and length of hub to be secured to the spindle close to the bearings of the spindle, so that they will be firmly supported while under the action of the cutting devices. In generating the teeth of gears having different pitch-cones the ratio between the swinging movement of the carrier and the rotary movement of the spindle on its axis must be varied, and the series of gears 23 are accordingly so mounted and arranged that the gears may be changed to vary the speed of shaft 24 with relation to the rotation of shaft 22. This series of gears is mounted and arranged in a manner common in change-gearing and is one simple form of variable-speed mechanism for varying the ratio between the swinging and rotary movements of the spindle. The arrangement of the gearing is clearly shown in Fig. 10. Gears 39 and 40 are secured to the upper ends of shafts 22 and 24, respectively, and are connected through two connected gears 41, carried on an arm $41^a$ adjustable about the shaft 22, one of the connected gears meshing with the gear 39 and the other with gear 40. By changing the gears the movement of shaft 24 with relation to the movement of shaft 22 may be varied, thereby varying the ratio between the rotary and swinging movements of the spindle.

The concentric gear 19 in addition to forming an efficient driver for rotating the spindle also lends itself to the employment of a simple and effective indexing mechanism for turning the blank to bring successive parts into position to be acted upon by the cutting devices, since such indexing may be accomplished by intermittently giving the gear a partial revolution. To provide for this manner of indexing, the gear 19 is mounted to turn upon the bushing 20 and is connected with a worm-wheel 42, which is engaged by a worm 43, Figs. 2 and 5, secured to a shaft 44. During the action of the cutting devices the worm-shaft 44 is stationary and the worm and worm-wheel act as a lock for holding the gear 19. The worm-shaft is connected, through suitable gearing, Figs. 2 and 4, with a shaft 45, which is given one or more revolutions whenever the indexing is to take place. To provide for indexing gears having different numbers of teeth, a variable-speed mechanism consisting of change-gearing 46, such as is commonly used in indexing mechanisms, is introduced in the connections between shaft 45 and 44. With this manner of indexing through the gearing 23, which determines the ratio between the swinging and rotary movement of the spindle, any error in this gearing is introduced into the indexing, and in cases where it is necessary to use fractional gearing between shafts 22 and 24 in order to closely approximate the theoretically-correct ratio the indexing would not be effected with sufficient accuracy were this error not rectified. In other words, to accurately index the spindle 3 the ratio between the movement of shaft 45 and the spindle should be exact and not approximate. To insure this under all conditions, a rectifying mechanism consisting of a series of gears corresponding to the series of gears 23 between shafts 22 and 24, but inversely arranged, is introduced between the variable-speed mechanism of the indexing mechanism and the worm-shaft 44. This gearing consists of a gear 47, secured to the shaft 44, a gear 48, secured to the shaft 49, and two connected gears 50, mounted upon an arm 51, adjustable about the shaft 49. The gear 47 is the same as gear 39, and gear 48 is the same as gear 40 of gearing 23, while the connected gears 50 and 41 are the same, the gear which meshes with gear 47 corresponding to the gear which meshes with gear 39 and the gear which meshes with gear 48 corresponding to the gear which meshes with gear 40. With these two sets of gearing thus arranged one set nullifies the effect of the other, and the indexing is unaffected by changes in both sets of gearing. The shaft 49 is connected with the change-gearing 46 through bevel-gears 52.

Figure 13:
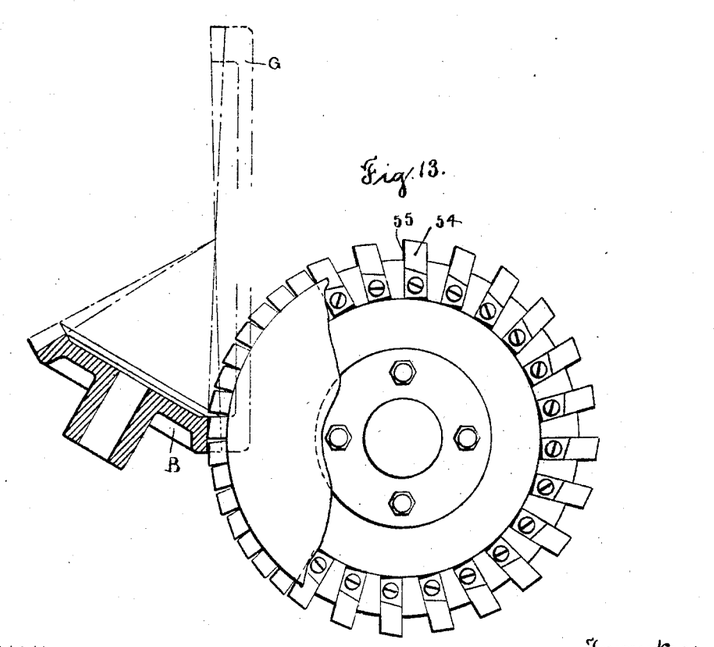
Figs. 13 and 14 are details showing the mode of operation of the cutters when adjusted to form a tooth of a crown-gear.
Figure 14:
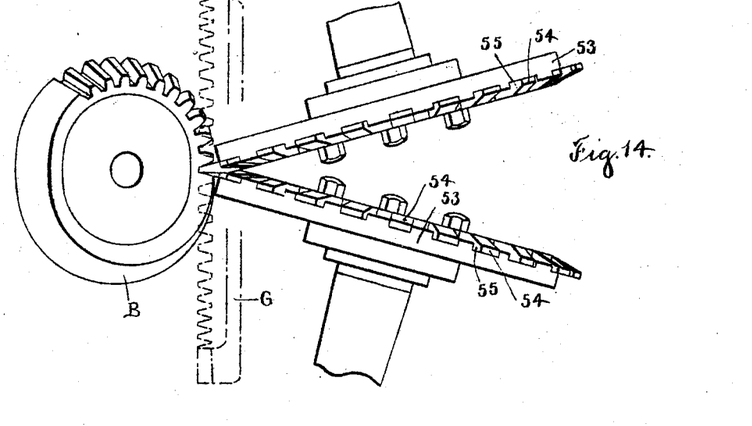

The cutting devices consist of two disks 53, provided at their peripheries with teeth 54. The disks are so arranged that the cutting edges 55 of the teeth travel in planes corresponding to the surfaces of teeth of an imaginary crown-gear G, (indicated in Figs. 13 and 14,) the axis of which coincides with the axis of the carrier 4. To enable the edges 55 to travel in planes corresponding to the tooth-surfaces at opposite sides of a space between adjacent teeth of the crown-gear in generating teeth which are close together, the teeth of one cutter are arranged to work in the spaces between the teeth of the other cutter. The disks are of such diameter that that portion of the edges of the disks where they come together are, in effect, a tooth of the crown-gear, so that the opposite surfaces of adjacent gear-teeth may be generated on the blank B by rolling the blank against the edges of the disks at this point.

The devices for supporting the cutters and for enabling the various adjustments to be made which give the machine the capacity of generating various forms and sizes of teeth on various forms and sizes of blanks are supported on a head 56, carried by a slide 57, mounted on the base 2. Each cutting-disk is secured to a shaft 58 and is driven through a worm-wheel 59, secured to the shaft and engaged by a worm 60. The worm 60 is secured to a shaft 61, which is connected by a universal joint with one part of a telescoping shaft 62, the other part of which is connected by a universal joint with a shaft 63. The shafts 63 are connected, through bevel-gears 64, with a shaft 65, which is connected with a shaft 66 through spiral gears 67. The shaft 66 is connected, through bevel-gears 68, with a driving-shaft 69, to which a cone-pulley 70 is secured. Through this system of shafts and gearing the cutters are continuously rotated.

To enable the cutters to be adjusted to vary the inclination of the sides of the teeth of the imaginary gear G with reference to the pitch-surface, each shaft 58 is mounted in a bearing-block 71, guided in segmental ways in blocks 72. A gear-segment 73 is formed on the bearing-block and is engaged by a pinion 74, secured to a shaft 75 in the block 72. The shaft 75 is provided with a polygonal head for the reception of a crank-handle, and by turning the shaft the bearing-block may be moved on its segmental ways. The bearing-block is firmly secured in its adjusted position by clamping-bolts 76. The segmental ways are so formed that the cutting-disk will turn about an axis parallel to the pitch-surface of the gear G and pass through the active edge of the disk when the bearing-block is adjusted. By varying the inclination of the sides of the tooth of the imaginary gear as indicated the angle of pressure of the imaginary gear may be varied with a resulting variation in the angle of pressure of the generated gear-teeth. In other words, the cutters may be adjusted to form gear-teeth in which the normal, through the common point of contact between the intermeshing teeth of two gears, will make any desired angle with the common tangent to the pitch-circles of the gears, this angle being what is known as the "angle of pressure" of the gear-teeth. If the cutters are to have the capacity of cutting in planes corresponding to tooth-surfaces of different gears, the machine should be provided with means for varying the inclination of the cutting planes about an axis parallel to the axis of the gear G. To enable the inclination of the cutting planes to be thus varied, the block 72 is mounted on segmental ways 77 on a slide 78. The block 72 carries a worm 79, which engages a rack 80, pivoted on the slide 78, and by turning the worm the block may be adjusted on the slide to adjust the cutting plane about an axis parallel to the axis of the gear G. This adjustment determines the divergence between the elements extending from the apex of the pitch-cone and forming the sides of the teeth. The block 72 is firmly held in adjusted position by binding-bolts 81, which force clamping-blocks 82 against the ways 77. To enable the cutters to be adjusted to vary the width of the teeth being cut, each slide 78 is mounted for lateral adjustment on ways 83, formed on a slide 84. The slide 78 may be adjusted laterally on its ways by a screw-rod 85, arranged as is common in metal-working machines, and when adjusted is firmly held by a gib 86 in a common manner. The slide 84 is mounted on ways 87 on the head 56 and may be adjusted by a screw 88 to bring the cutters into proper relation to the axis of the carrier 4 and when adjusted is firmly held by a gib 89. By the various adjustments described the cutters may be adjusted to correspond with a tooth of a crown-gear of any desired diameter or pitch and having any desired angle of pressure. The angle of pressure is determined by adjustment of the blocks 71 on their curved ways, and the blocks 71 having been once adjusted for a given angle of pressure remain fixed on the blocks 72 so long as gears are to be generated with that angle of pressure. By adjusting the slide 84 vertically the distance between the cutters and the axis of the carrier 4 may be varied in varying the diameter of the imaginary crown-gear. By adjusting the slides 78 laterally the cutters may be adjusted to vary the width of the teeth. This adjustment may be made in varying the pitch or the diameter of the imaginary crown-gear. A variation in the pitch or size of the imaginary crown-gear also involves an adjustment of the blocks 72 on their curved ways to bring the cutting-planes into such relation that they will pass through the center of the pitch-surface of the crown-gear. This is because the movement of the cutters either vertically or laterally carries their cutting-planes away from the center of the pitch-surface of the crown-gear, and the cutters must therefore be swung about an axis parallel to the axis of the crown-gear to bring the cutting-planes into proper relation in the new adjustment of the cutters. The screw 88 carries a bevel-gear 90, which is engaged by a bevel-gear 91, secured to a shaft which is provided with a hand-wheel 92, by turning which the screw may be operated. To accommodate the adjustment of the slide 84, the spiral gears 67 are carried on the slide and the shaft 66 is arranged to slide through one of the gears.

Figure 7:
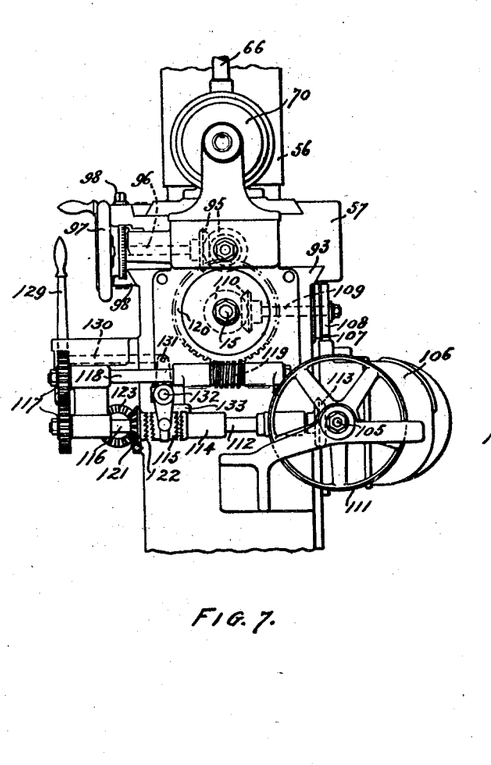
Fig. 7 is an elevation of a part of the right end of the machine.
Figure 8:
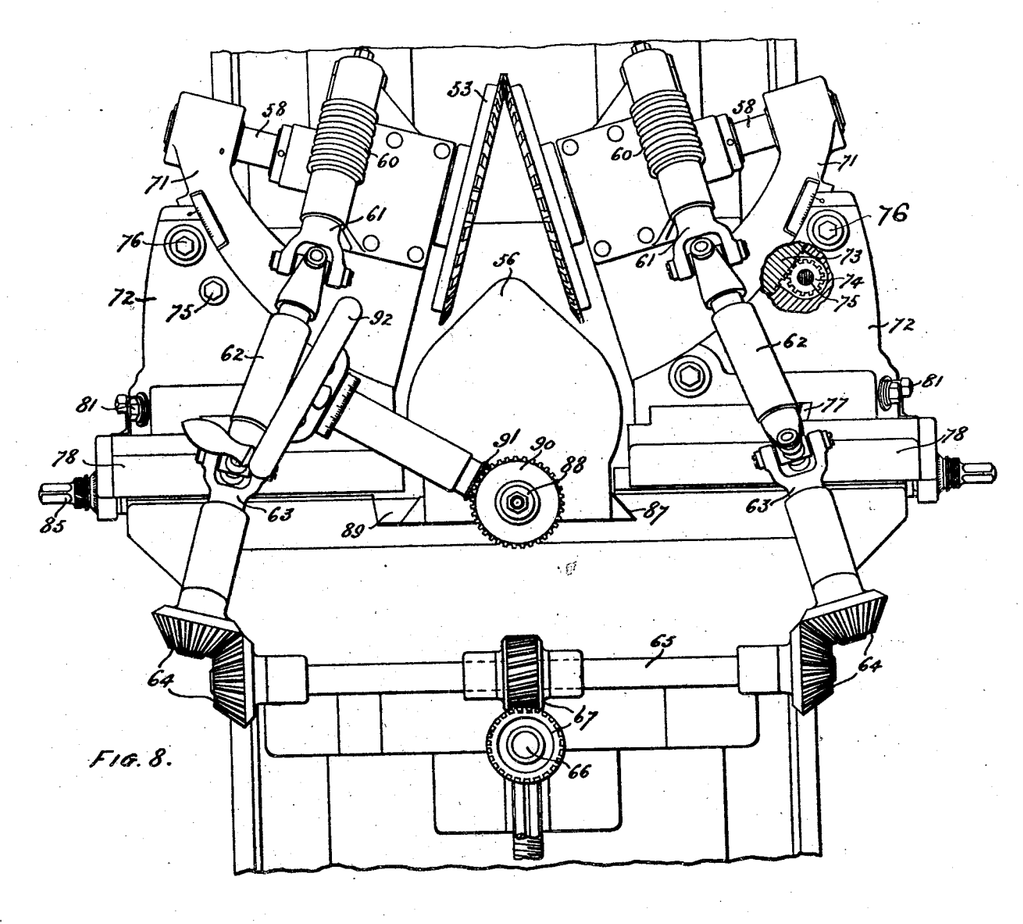
Fig. 8 is a plan view showing the cutter supporting and driving devices.
Figures 9, 15:
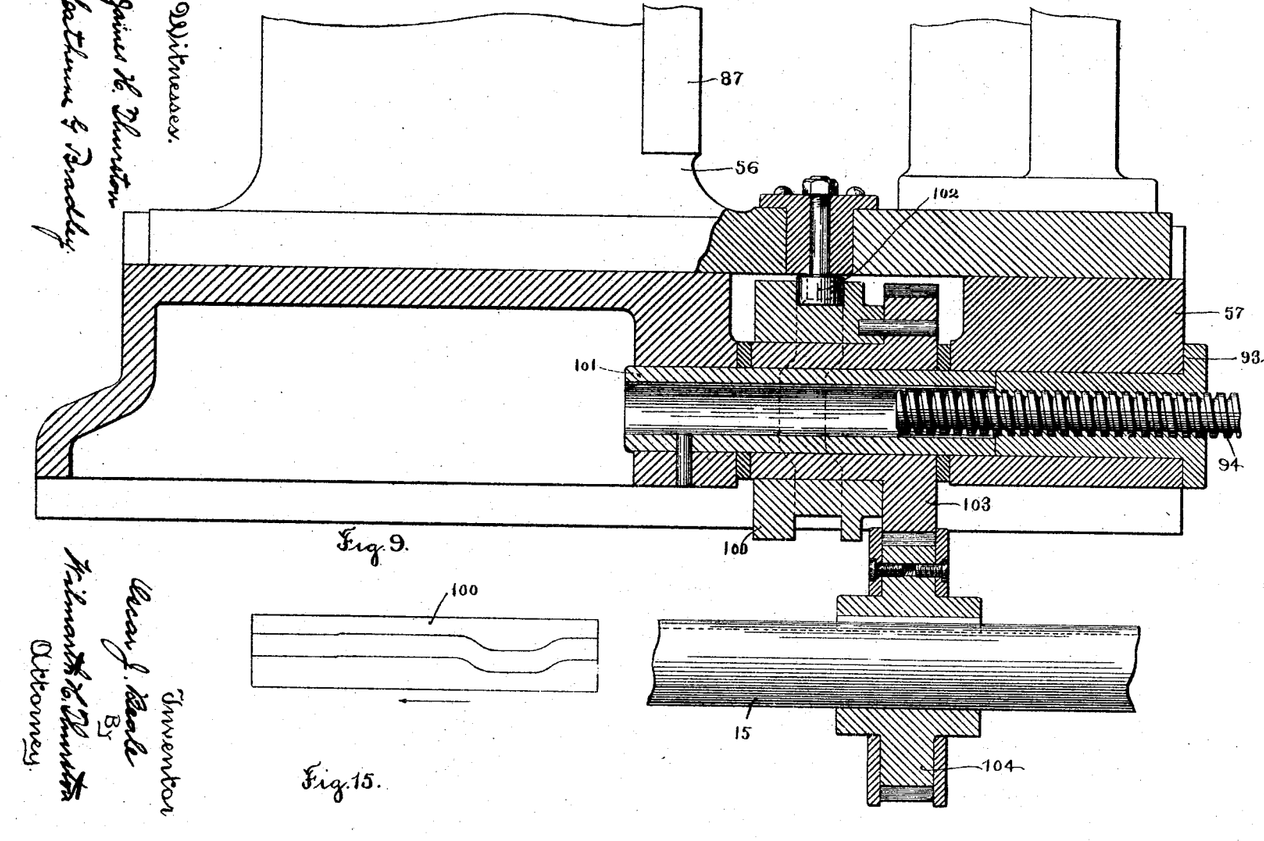
Fig. 9 is a sectional detail of the devices for moving the cutter-head to and from the blank-supporting head.
Fig. 15 is a view showing a development of cam 100.

The slide 57 and the cutter-head 56 carried thereby are adjustable to and from the blank-supporting head to facilitate the insertion and removal of the gear-blanks and to bring the cutters into proper relation to the blank. For this purpose the slide 57 is mounted on ways 93 on the base 2 and is provided with a nut 93ª, Figs. 1 and 9, engaged by a screw-rod 94, mounted on the base. The screw-rod is connected through bevel-gears 95, Fig. 7, with a shaft 96, and the shaft is provided with a hand-wheel 97, through which the screw may be operated to move the slide 57 on its ways. The slide may be firmly held in adjusted position by clamping-bolts 98, Fig. 7. An adjustable stop 99 may be secured to the ways 93 for determining the forward position of the slide 57 when cutting a number of duplicate gears.

To increase the rapidity with which the gears may be cut, the swing of the carrier 4 is adjusted so that the blank rolls only far enough to complete the tooth-surface being formed—that is to say, the blank does not roll far enough away from the cutter to enable the indexing to be performed. This shortening up of the swing of the blank therefore involves a relative movement between the cutter and blank independent from the rolling motion of the blank to clear the cutter from the blank for the indexing and to bring the cutter and blank back into the proper relation for generating the next tooth-surfaces after the indexing has taken place. This movement is produced by withdrawing and advancing the cutter-head 56 on the slide 57. The reciprocation of the cutter-head is effected by a cam 100, Figs. 1 and 9, mounted on a stud 101, secured to the slide 57. The cam is provided with a cam-groove which is engaged by a roll 102, mounted on the head 56. The cam is driven through a gear 103, secured thereto and engaged by a gear 104, keyed to slide on the shaft 15. The cam-groove is so formed that the cutter-head is withdrawn and advanced while the carrier 4 is at the forward end of its throw, and the indexing mechanism is timed to act while the cutter-head is retracted. By adjusting the throw of the carrier to carry the blank clear of the cutter the reciprocating mechanism for the cutter-head may be omitted; but this would reduce the rapidity of the operations, and consequently the production of the machine. The blank rolls against the cutters on both its backward and forward swing, and the quality of the work done will be improved by so controlling the cutter-head that the greater portion of the stock will be removed by the cutters as the blank swings rearward. This is on the movement of the blank away from the indexing-point, and then a light finishing cut will be taken as the blank swings forward or toward the indexing-point. This is done by so forming the cam-groove in the cam 100 that the cutter-head will be advanced within a few hundredths of an inch of its forward position directly after the indexing and will be advanced to its forward position as the blank reaches the end of its rearward swing.

Figure 1:
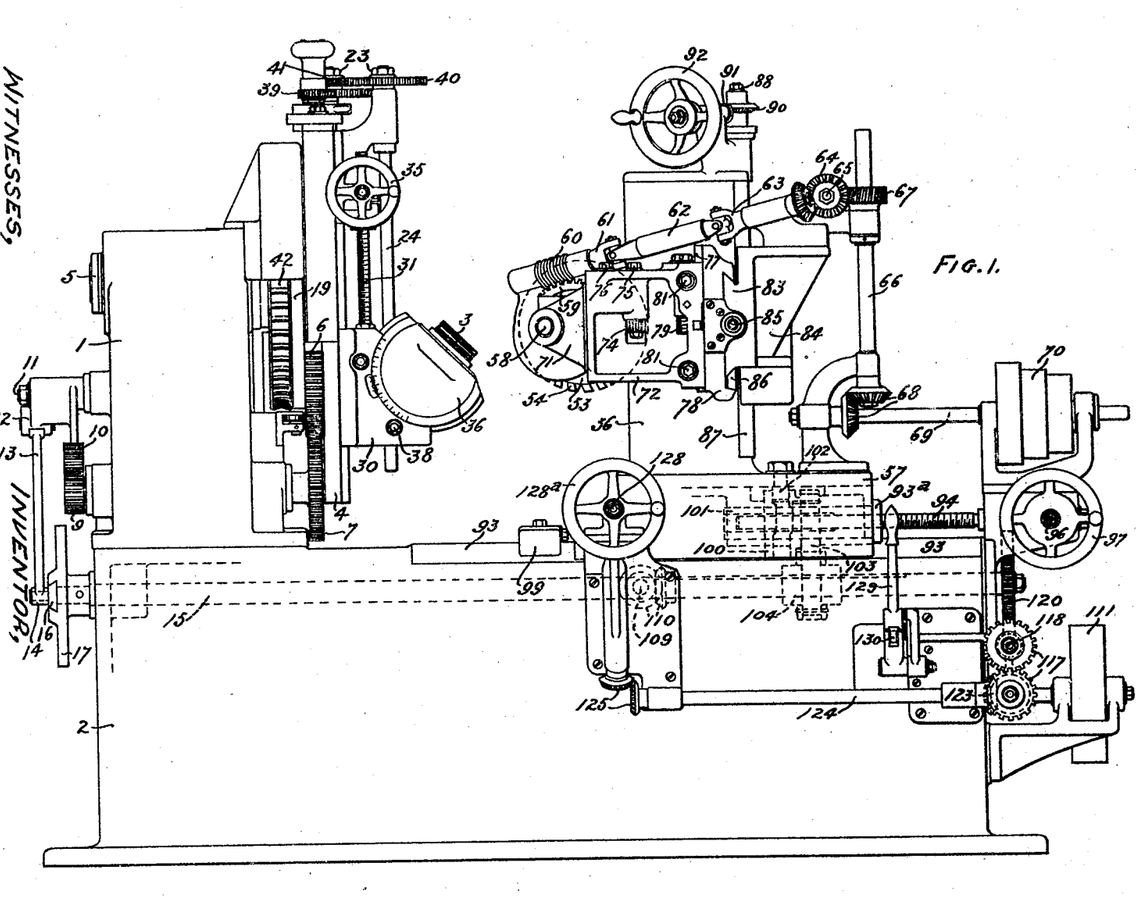
Figure 1 is a front elevation of the machine.
Figures 2, 3:
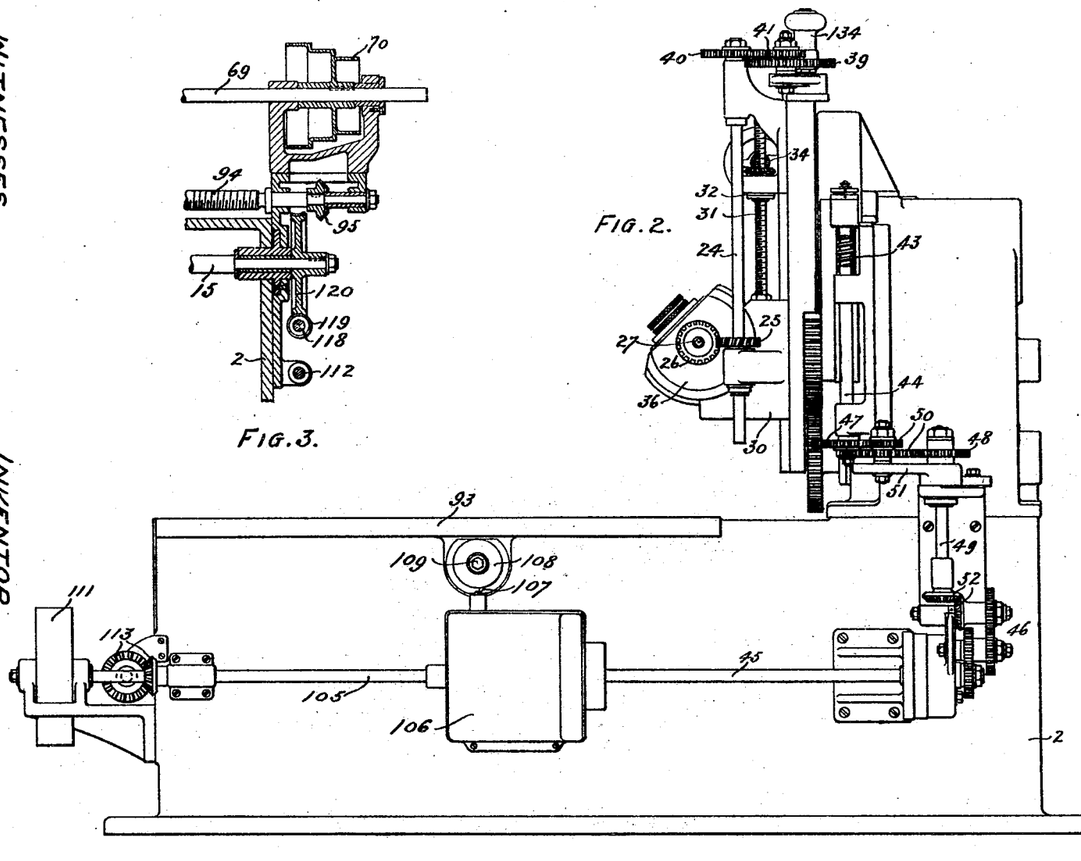
Fig. 2 is a rear elevation with some of the parts removed.
Fig. 3 is a detail section through a portion of the driving mechanism.
Figure 4:
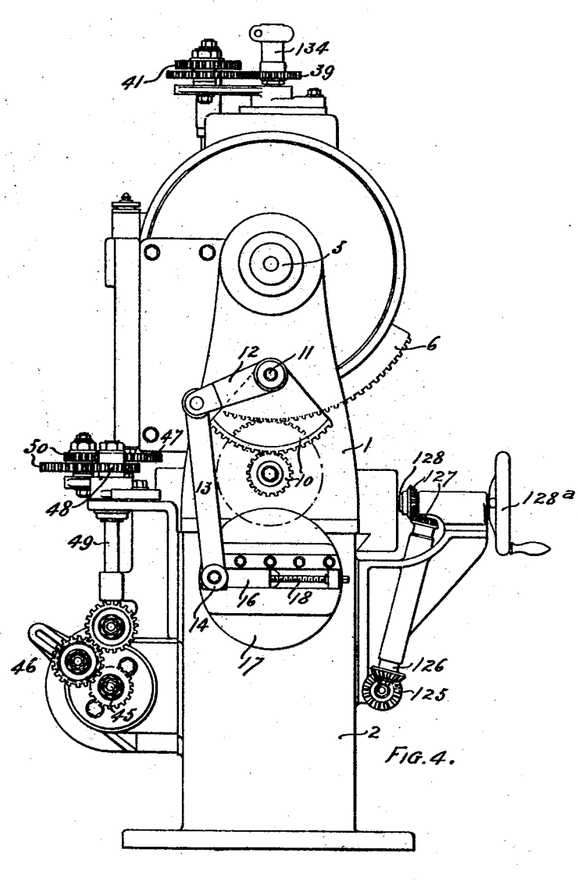
Fig. 4 is an elevation looking at the left end of the machine.
Figure 5:
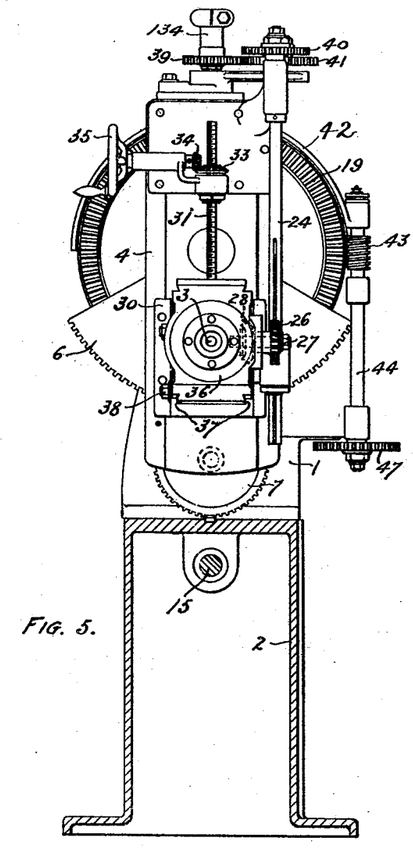
Fig. 5 is an elevation of the front of the blank-supporting head.

The shaft 45 is revolved at the proper time to effect the indexing from a continuously-running shaft 105, Fig. 2, with which the shaft 45 is connected and disconnected through a clutch mechanism mounted in a casing 106. This mechanism may be of any well-known construction—such, for instance, as that shown in Patent No. 645,083, March 13, 1900, and may be thrown into action by a trip 107, carried by a disk 108. The disk 108 is secured to a shaft 109, Figs. 1, 2, and 7, which is driven, through bevel-gears 110, from shaft 15. The shaft 105 is driven through a pulley 111, secured thereto, and the shaft 15 is driven from the shaft 105 through the following gearing and shafting. A shaft 112 is connected with shaft 105 through bevel-gears 113 and carries one member 114 of a clutch, the other member 115 of which is keyed to slide on a shaft 116. The shaft 116 is connected, through gears 117, with a shaft 118, which carries a worm 119, engaging a worm-wheel 120, secured to the shaft 15. When the clutch members are engaged, the shaft 15 is driven from shaft 105. The shaft 105 may be normally operated in making ready the machine through a bevel-gear 121, loosely mounted on shaft 116 and provided with a clutch member 122, arranged to be engaged by the clutch member 115. The gear 121 is engaged by a gear 123, secured to a shaft 124, which is connected, through bevel-gears 125, with a shaft 126, Figs. 1 and 4, which is in turn connected, through bevel-gears 127, with a shaft 128. The shaft 128 carries a hand-wheel 128$^a$, which may be turned to operate the gear 121. The clutch member 115 may be shifted to throw either the hand or power operating mechanism into operation through a lever 129, connected by a rod 130 to an arm 131, secured to a rock-shaft 132, which is connected by an arm 133 with the clutch member.

Figure 6:
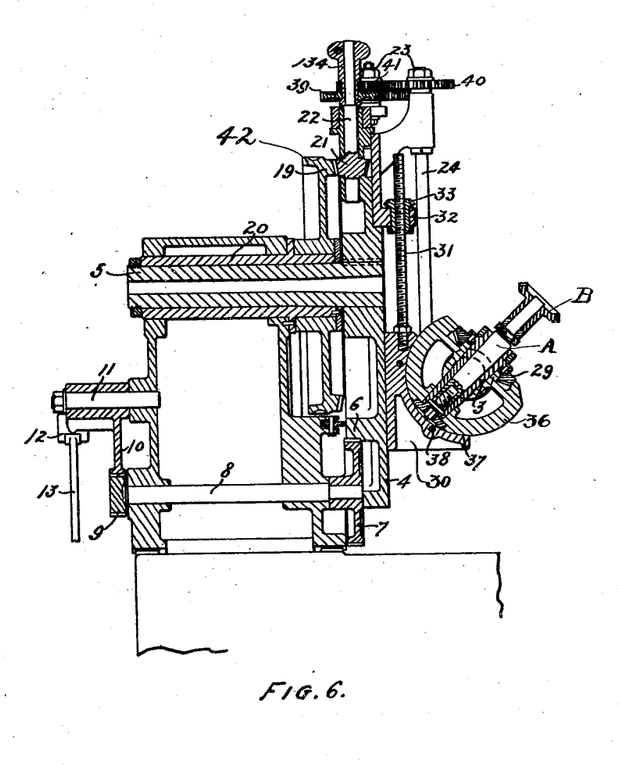
Fig. 6 is a longitudinal vertical section through the blank-supporting head.

In setting up the machine an arbor A, Fig. 6, is secured in the spindle 3, to the end of which the gear-blank B is secured. The spindle is then adjusted so that the apex of the pitch-cone of the gear-blank is in the axis of the carrier 4, and one side of the pitch-cone is in a vertical plane, and the gearing is arranged so that when the carrier swings the pitch-cone of the gear-blank will roll on the vertical plane. The cutters are adjusted so that the active edges of the cutter-disks correspond to the surfaces of a tooth of the imaginary crown-gear G, and the slide 57 is adjusted so that when the cutter-head is in its advanced position the pitch-surface of the crown-gear is tangent to the pitch-cone of the gear-blank. In case the teeth of the gear-blank have been roughed out the blank may be adjusted to bring the space between the teeth in proper relation to the cutter by loosening the clamping-sleeve 134, through which the gear 39 is connected to the shaft 22, and turning the sleeve until the blank is properly positioned, after which the sleeve is firmly clamped to shaft 22. After the spindle and cutters have been properly set the machine is started and the gear-blank is rolled against the edges of the cutting-disks, the pitch-surface rolling on a vertical plane. At the end of the rearward swing of the carrier the cutter-head is advanced slightly by the cam, bringing the pitch-surface of the crown-gear G tangent to the pitch-cone of the blank, and as the carrier swings forward the cutters generate the opposite surfaces of two adjacent teeth on the gear-blank. At the end of the forward swing of the carrier the cutter-head is retracted and the blank is indexed preparatory to the next reciprocation of the carrier, after which the cutter-head is advanced. This cycle of operations is repeated until all the teeth on the blank have been generated.

What I claim as my invention, and desire to secure by Letters Patent, is—

1. In a machine for generating gear-teeth, the combination of a swinging carrier, a blank-spindle carried thereby with its axis oblique to the axis of the carrier, and a carriage for the spindle mounted for adjustment on the carrier in a direction to change the point at which the axis of the spindle intersects the axis of the carrier, substantially as described.

2. In a machine for generating gear-teeth, the combination of a carrier, a blank-supporting spindle mounted thereon and adjustable to vary the angle between the axes of the spindle and carrier, a gear concentric to the center about which the spindle is adjusted, gearing between said gear and spindle, a driving member, rotary connections between said driving member and gear, and mechanism for reciprocating the carrier with relation to the driving member whereby the spindle is rotated through the reciprocation of the carrier, substantially as described.

3. In a machine for generating gear-teeth, the combination of a swinging carrier, a carriage mounted for radial adjustment on the carrier, a blank-spindle mounted for adjustment in the carriage to vary the angle between the axes of the spindle and carrier, and mechanism for rotating the spindle as the carrier swings to give the blank a rolling motion, substantially as described.

4. In a machine for generating gear-teeth, the combination of a swinging carrier, a carriage radially adjustable thereon, a swivel-head on said carriage having its axis at right angles to the axis of the carrier, a blank-supporting spindle mounted in said head, and mechanism for rotating the spindle on its axis as the carrier swings to give the blank a rolling motion, substantially as described.

5. In a machine for generating gear-teeth, the combination of a carrier, a blank-supporting spindle mounted for adjustment thereon to change the angle between the axes of the spindle and carrier, a gear concentric to the center about which the spindle is adjusted, gearing between said gear and spindle, a gear concentric to the axis of a carrier, change-gearing between said concentric gears through which the spindle is rotated, and mechanism for swinging the carrier with relation to the gear concentric to its axis, substantially as described.

6. In a machine for generating gear-teeth, the combination of a swinging carrier, a carriage radially adjustable on the carrier, a head thereon adjustable about an axis at right angles to the axis of said carrier, a spindle mounted in said head in the plane of the axis of the carrier, a gear concentric with the axis of the head and connected with the spindle, a shaft on the carrier connected through change-gears with said concentric gear, and means for driving said gears as the carrier swings, substantially as described.

7. In a machine for generating gear-teeth, the combination of a blank-spindle, mechanism for oscillating said blank-spindle about an axis, a gear concentric with said axis, connections between said gear and spindle for rotating said spindle about its own axis, and mechanism for operating said gear to index said spindle, substantially as described.

8. In a machine for generating gear-teeth, the combination, with a blank-supporting spindle, of mechanism for automatically oscillating the spindle about an axis intersecting the spindle-axis and simultaneously rotating the spindle about its own axis to give the blank a rolling motion, a gear concentric with the axis of oscillation and connected with said spindle to rotate the same, and mechanism for operating said gear to index said spindle, substantially as described.

9. In a machine for generating gear-teeth, the combination of a swinging carrier, a blank-spindle mounted thereon, a gear concentric with the axis of said carrier, gearing between said spindle and gear for rotating the spindle as the carrier swings, and mechanism for intermittently advancing said gear to index the spindle, substantially as described.

10. In a machine for generating gear-teeth, the combination of a swinging carrier, a blank-spindle mounted thereon, a gear concentric with the axis of said carrier, gearing between the concentric gear and the spindle for rotating the spindle as the carrier swings, a worm-wheel connected with the concentric gear, a worm engaging said wheel and means for operating the worm to index the blank, substantially as described.

11. In a machine for generating gear-teeth, the combination of a reciprocating blank-spindle of gearing for rotating the spindle on its axis as it reciprocates, mechanism for indexing the blank-spindle, and a rectifying mechanism for eliminating from the indexing movements of the blank-spindle any error due to said gearing, substantially as described.

12. In a machine for generating gear-teeth, the combination of a swinging blank-spindle, variable-speed gearing for rotating the spindle on its axis as it swings, means for indexing the blank, and rectifying-gearing for nullifying the effect of said variable-speed gearing on the indexing, substantially as described.

13. In a machine for generating gear-teeth, the combination of a swinging carrier, a blank-supporting spindle mounted thereon, variable-speed gearing for rotating the spindle on its axis as the carrier swings, mechanism for indexing the blank-spindle and gearing similar to the variable-speed gearing but inversely arranged for nullifying the effect of the variable-speed gearing on the indexing, substantially as described.

14. In a machine for generating gear-teeth, the combination of a swinging carrier, a blank-supporting spindle mounted thereon, a gear concentric with the axis of the carrier, change-gearing between the concentric gear and spindle, means for turning said gear to index the blank-spindle including change-gearing similar to the former change-gearing and inversely arranged, substantially as described.

15. In a machine for generating gear-teeth, the combination of two cutters the active parts of which are a tooth of an imaginary gear, and mechanism for causing a relative rolling motion between a gear-blank and said cutters to generate the adjacent surfaces of two teeth on said blank, substantially as described.

16. In a machine for generating gear-teeth, the combination of a blank-carrying spindle, two cutters moving about fixed axes and so arranged that their active parts are a tooth of an imaginary gear, and mechanism for rolling a gear-blank against said cutters to generate the adjacent surfaces of two teeth thereon, substantially as described.

17. In a machine for generating gear-teeth, a cutting device consisting of two cutters the active parts of which are in effect a tooth of an imaginary gear, substantially as described.

18. In a machine for generating gear-teeth, a cutting device consisting of two cutter-disks having their axes inclined to each other, and having their active portions close together and arranged to act upon tooth-surfaces between two adjacent teeth, substantially as described.

19. In a machine for generating gear-teeth, a cutting device consisting of two cutter-disks having their axes inclined to each other and having their active portions close together and arranged to act upon tooth-surfaces between two adjacent teeth, and means for adjusting the inclination of the axes, substantially as described.

20. In a machine for generating gear-teeth, a cutter-disk the active part of which is a tooth-surface of an imaginary gear, and means for adjusting the cutter so that the active part may be the tooth-surface of imaginary gears of differing diameters, substantially as described.

21. In a machine for generating gear-teeth, a cutter-disk the active part of which is a tooth-surface of an imaginary gear, and means for adjusting the cutter so that the active part may be the tooth-surface of imaginary gears of differing pitch, substantially as described.

22. In a machine for generating gear-teeth, two cutter-disks having their axes inclined to each other, and having the teeth of one cutter working in the spaces between the teeth of the other cutter.

23. In a machine for generating gear-teeth, two cutter-disks the active parts of which are a tooth of an imaginary crown-gear, and means for adjusting the cutters so that their active parts may be the tooth of imaginary gears of differing diameters, substantially as described.

24. In a machine for generating gear-teeth, two cutter-disks the active parts of which are a tooth of an imaginary crown-gear, and means for adjusting the cutters so that their parts may be the tooth of imaginary gears of differing pitch, substantially as described.

25. In a machine for generating gear-teeth, two cutter-disks the active teeth of which are a tooth of an imaginary gear, and means for adjusting the cutters to vary the width of said tooth, substantially as described.

26. In a machine for generating gear-teeth, a cutter having its cutting edges traveling in a plane corresponding to the tooth-surface of an imaginary crown-gear, means for adjusting the cutter about an axis parallel to the axis of said gear, substantially as described.

27. In a machine for generating gear-teeth, a cutter-disk 53 mounted in a bearing-block 71, a block 72 having segmental ways on which the bearing-block is mounted, a slide 78 having segmental ways on which the block 72 is mounted, and a support on which the slide 78 is mounted, substantially as described.

28. In a machine for generating gear-teeth, the combination of a blank-supporting spindle, mechanism for rotating said spindle on its axis and mechanism for swinging it about an intersecting axis, a cutter against which the gear-blank is rolled by the movement of the spindle, and means for adjusting the cutting-plane about an axis parallel to said intersecting axis, substantially as described.

29. In a machine for generating gear-teeth, the combination of a blank-supporting spindle, mechanism for rotating said spindle on its axis and mechanism for swinging it about an intersecting axis, a cutter against which the blank is rolled by the movement of the spindle, means for adjusting the cutting-plane about an axis parallel to said intersecting axis, and means for adjusting the distance of the cutter from said intersecting axis, substantially as described.

30. In a machine for generating gear-teeth, the combination of a cutting-disk rotating about a fixed axis and so arranged that the cutting edges travel in a plane corresponding to a tooth-surface of an imaginary gear, mechanism for rolling a gear-blank against said cutter with a motion as if rolling on its pitch-surface upon the pitch-surface of said gear, mechanism for automatically indexing the blank and mechanism for automatically separating said cutter and blank independently of said rolling motion during the indexing, substantially as described.

31. In a machine for generating gear-teeth, the combination of a cutting device the cutting edges of which travel in a plane corresponding to a tooth-surface of an imaginary gear, mechanism for rolling a gear-blank in opposite directions against said cutter with a motion as if rolling on its pitch-surface upon the pitch-surface of said gear and mechanism for changing the relative positions of said cutter and blank between the movements in opposite directions, substantially as described.

32. In a machine for generating gear-teeth, the combination of two cutters the active parts of which are a tooth of an imaginary crown-gear, and mechanism for causing a relative rolling motion between a gear-blank and said cutters to generate the adjacent surfaces of two teeth on said blank, substantially as described.

33. In a machine for generating gear-teeth, the combination of two cutters the active parts of which are a tooth of an imaginary crown-gear, means for adjusting the cutting-planes about an axis parallel to the axis of the crown-gear, and mechanism for rolling a gear-blank against said cutters, substantially as described.

34. In a machine for generating gear-teeth, the combination of two cutters the active parts of which are a tooth of an imaginary crown-gear, means for adjusting the cutting-planes about an axis parallel to the axis of said crown-gear, means for adjusting the cutters to and from the axis of said crown-gear, and mechanism for rolling a gear-blank against said cutters, substantially as described.

35. In a machine for generating gear-teeth, the combination of two cutters the active parts of which are a tooth of an imaginary crown-gear, means for adjusting the cutters toward and away from each other, and means for adjusting the cutting-planes about an axis parallel to the axis of the crown-gear, substantially as described.

OSCAR J. BEALE.

Witnesses:
W. H. THURSTON,
J. H. THURSTON.